(12) United States Patent
Devarajan et al.

(10) Patent No.: US 10,541,904 B2
(45) Date of Patent: Jan. 21, 2020

(54) ESTABLISHING A NETWORK FAULT DETECTION SESSION

(71) Applicant: HEWLETT PACKARD ENTERPRISE DEVELOPMENT LP, Houston, TX (US)

(72) Inventors: Venkatavaradhan Devarajan, Bangalore (IN); Chivukula Koundinya, Bangalore (IN); Gopinatha Rao P, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 156 days.

(21) Appl. No.: 15/659,908

(22) Filed: Jul. 26, 2017

(65) Prior Publication Data

US 2018/0167262 A1 Jun. 14, 2018

(30) Foreign Application Priority Data

Dec. 14, 2016 (IN) .............................. 201641042692

(51) Int. Cl.
*H04L 12/26* (2006.01)
*H04L 12/24* (2006.01)
(Continued)

(52) U.S. Cl.
CPC .............. *H04L 43/16* (2013.01); *H04L 29/08* (2013.01); *H04L 29/08612* (2013.01);
(Continued)

(58) Field of Classification Search
CPC ... H04L 43/16; H04L 29/08612; H04L 1/002; H04L 29/08594; H04L 67/141; H04L 43/10
See application file for complete search history.

(56) References Cited

U.S. PATENT DOCUMENTS

| 7,561,527 B1 * | 7/2009 | Katz | H04L 43/50 370/241 |
| 7,765,306 B2 * | 7/2010 | Filsfils | H04L 45/02 709/207 |

(Continued)

FOREIGN PATENT DOCUMENTS

| CN | 101087211 A | 12/2007 |
| CN | 101163060 A | 4/2008 |
| CN | 101599948 A | 12/2009 |

OTHER PUBLICATIONS

Govindan et al, Clarifying Procedures for Establishing BFD Sessions for MPLS Label Switched Paths (LSPs), IETF, Jan. 2016 (Year: 2016).*

(Continued)

*Primary Examiner* — Omer S Mian
(74) *Attorney, Agent, or Firm* — Hewlett Packard Enterprise Patent Department

(57) ABSTRACT

Examples relate to establishing a network fault detection session. In one example, a routing device may receive a request to initiate a bidirectional forwarding detection (BFD) session with a second routing device; transmit a first echo frame to the second routing device; receive a first response frame; determine that a response time does not meet a response time threshold; in response to the determination, determine that a BFD failure threshold has not been met; after the determination that the BFD failure threshold has not been met, transmit a second echo frame to the second routing device; receive a second response frame; determine whether a second response time meets the BFD response time threshold; and in response to determining that the second response time meets the BFD response time threshold, provide a notification that a BFD session has been established between the routing device and the second routing device.

8 Claims, 4 Drawing Sheets

(51) Int. Cl.
 *H04L 12/703* (2013.01)
 *H04L 12/741* (2013.01)
 *H04L 29/08* (2006.01)

(52) U.S. Cl.
 CPC .......... *H04L 41/0668* (2013.01); *H04L 43/10* (2013.01); *H04L 45/28* (2013.01); *H04L 45/745* (2013.01); *H04L 67/141* (2013.01)

(56) References Cited

U.S. PATENT DOCUMENTS

| | | | |
|---|---|---|---|
| 7,986,619 B2* | 7/2011 | Sugawara | H04L 12/4637 370/222 |
| 8,331,245 B2 | 12/2012 | Zheng | |
| 9,166,877 B2 | 10/2015 | Rahman et al. | |
| 9,444,709 B2* | 9/2016 | Li | H04L 67/141 |
| 9,473,372 B1* | 10/2016 | Grammel | H04L 43/0811 |
| 9,614,753 B2* | 4/2017 | Li | H04L 45/00 |
| 9,781,031 B2* | 10/2017 | Chiang | H04L 12/2834 |
| 9,781,058 B1 | 10/2017 | Addepalli | H04L 47/12 |
| 2007/0207591 A1* | 9/2007 | Rahman | H04L 45/00 438/439 |
| 2010/0014433 A1* | 1/2010 | Wang | H04L 45/00 370/242 |
| 2010/0049868 A1* | 2/2010 | Ginsberg | H04L 45/00 709/242 |
| 2010/0149992 A1* | 6/2010 | Tan | H04L 45/02 370/242 |
| 2011/0286324 A1* | 11/2011 | Bellagamba | H04L 41/0677 370/219 |
| 2012/0224469 A1* | 9/2012 | Erke | H04L 12/14 370/221 |
| 2013/0088953 A1* | 4/2013 | Zhao | H04L 45/22 370/218 |
| 2013/0114402 A1* | 5/2013 | Ould-Brahim | H04L 43/0811 370/225 |
| 2015/0358366 A1* | 12/2015 | Liang | H04L 12/4633 709/227 |
| 2016/0050102 A1* | 2/2016 | Natarajan | H04L 43/0811 370/228 |
| 2016/0197853 A1* | 7/2016 | Kumar | H04L 45/02 370/389 |
| 2017/0099180 A1* | 4/2017 | Singh | H04L 12/413 |
| 2017/0272339 A1* | 9/2017 | Yang | H04L 43/00 |
| 2018/0183654 A1* | 6/2018 | Patel | H04L 41/0654 |
| 2018/0302271 A1* | 10/2018 | Liu | H04L 41/0677 |

OTHER PUBLICATIONS

Cisco Systems, Inc., "Cisco ASR 9000 Series Aggregation Services Router Routing Configuration Guide, Release 5.3.x," Jan. 12, 2015, pp. 1-686.

RFC, "Bidirectional Forwarding Detection", 2010, 49 pages.

* cited by examiner

ESTABLISHING A NETWORK FAULT DETECTION SESSION

BACKGROUND

Computer networks often involve the use of many networking devices that are designed to facilitate communications to and from devices operating on the networks. Such devices may include, for example, a variety of different types of network switches, routers, and server computers. When a fault occurs in a network device that is responsible for routing network communications, such as a network switch or router, fault detection methods are used to identify the fault, allowing communications to be re-routed around faulty devices.

BRIEF DESCRIPTION OF THE DRAWINGS

The following detailed description references the drawings, wherein.

DETAILED DESCRIPTION

Figure 1:
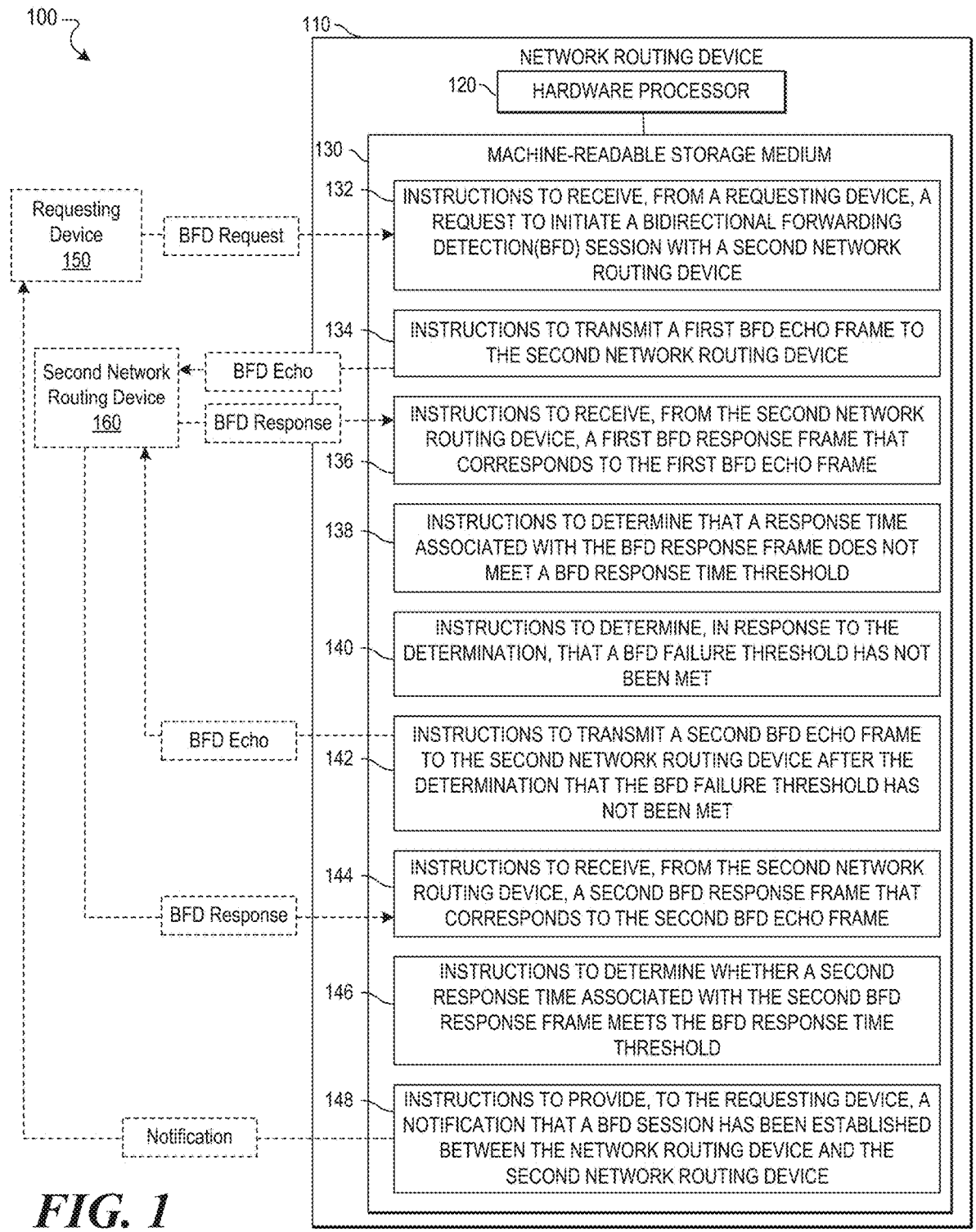
FIG. 1 is a block diagram of an example network routing device for establishing a network fault detection session.

Bidirectional forwarding detection (BFD) is one type of network fault detection which provides a failsafe for network communications. By way of example, BFD sessions cause network routers to rapidly send echo frames to other BFD routers to quickly detect link failures based on BFD response frames. When a BFD session is established between routers, the routers use hardware routing tables—which is typically faster than relying on software-based routing or an intermediary device's routing methods—to send BFD echo and response frames to one another, in a manner designed to ensure quick detection of a link failure. While a BFD session is initializing, however, the hardware routing table of a router that receives BFD echo frames may not be updated with the routing data of the router that sent the BFD echo frames. In this situation, the initializing router—the one sending the BFD echo frames—may remain in a state where slow response times for BFD response frames will not trigger a BFD session establishment failure. Instead, the initializing router may wait, e.g., for a certain period of time or for a certain number of BFD echo/response frames, before determining whether a BFD session was successfully established, allowing the second router time to add routing data for the initializing router to its hardware routing table.

In an example implementation, an enterprise network may include many routers that facilitate network communications to and from the enterprise network, as well as communications within the network. Establishing BFD sessions between network routers may allow for the quick re-routing of network communications in the case of a failure involving one of the network routers. A first network router may establish a BFD session with a second network router by sending BFD echo frames to the second router. The second network router, after receiving the BFD echo frames, sends BFD response frames to the first router. The first router may measure the response times and determine whether the response times for the BFD response frames meet a predetermined threshold. In a situation where the response times do not meet the threshold, the first router may remain in an initializing state, continuing to send and receive BFD frames and allowing the second router time to update its hardware routing table with data for routing the BFD response frames to the first router. When response times associated with the BFD response frames do meet the response time threshold, the first router may determine that the BFD session was successfully established, and send any notifications indicating BFD session establishment, if applicable. In a situation where response times do not meet the threshold, a second threshold may be used to determine whether BFD session establishment fails, e.g., the first router may remain in the initializing state for up to 30 seconds, or 100 BFD echo frames, before determining that BFD response frames that don't meet the response time threshold should indicate a failure to establish a BFD session. Further details regarding the establishment of a network fault detection session are described in the paragraphs that follow.

Referring now to the drawings, FIG. 1 is a block diagram 100 of an example network routing device 110 for establishing a network fault detection session. Network routing device 110 may be, for example, a network router, a network switch, a software-defined network (SDN) device, a server computer configured to route network traffic, or any other similar electronic device capable of processing network data, virtualized or not. In the example implementation of FIG. 1, the network routing device 110 includes a hardware processor, 120, and machine-readable storage medium, 130.

Hardware processor 120 may be one or more central processing units (CPUs), semiconductor-based microprocessors, and/or other hardware devices suitable for retrieval and execution of instructions stored in machine-readable storage medium, 130. Hardware processor 120 may fetch, decode, and execute instructions, such as 132-148, to control processes for establishing a network fault detection session. As an alternative or in addition to retrieving and executing instructions, hardware processor 120 may include one or more electronic circuits that include electronic components for performing the functionality of one or more instructions, e.g., a Field Programmable Gate Array (FPGA) or Application Specific Integrated Circuit (ASIC).

A machine-readable storage medium, such as 130, may be any electronic, magnetic, optical, or other physical storage device that contains or stores executable instructions. Thus, machine-readable storage medium 130 may be, for example, Random Access Memory (RAM), non-volatile RAM (NVRAM), an Electrically Erasable Programmable Read-Only Memory (EEPROM), a storage device, an optical disc, and the like. In some implementations, storage medium 130 may be a non-transitory storage medium, where the term "non-transitory" does not encompass transitory propagating signals. As described in detail below, machine-readable storage medium 130 may be encoded with executable instructions 132-148, for establishing a network fault detection session.

As shown in FIG. 1, the hardware processor 120 executes instructions 132 to receive, from a requesting device 150, a request to initiate a bidirectional forwarding detection session with a second network routing device 160. The requesting device 150 may be a variety of different devices, such as an input device attached to or in communication with the network routing device 110, a computing device operating an application that requests BFD, or a software-defined network controller. In some implementations, the BFD request may specify a target network router or routers for the network routing device to establish one or more BFD sessions. In some implementations, the BDF request may be a general request, permitting the network routing device to determine which other routing devices to establish a BFD session with, e.g., using a network topology and/or instructions from a SDN controller.

The hardware processor 120 executes instructions 134 to transmit a first BFD echo frame to the second network routing device 160. The BFD echo frame may be included in a stream of BFD echo packets send to the second network routing device 160. BFD echo frames are network packets that include data that causes the recipient to send a response, and facilitates initiation of a BFD session between routing devices. While the example diagram depicts the first BFD echo frame being transmitted directed to the second network routing device 160, in some implementations one or more intermediary devices, such as a network switch, may be used to transmit the BFD echo and response frames. In some implementations, the first BFD echo frame may cause the second network routing device 160 to add routing data, including an address, of the network routing device 110 to its hardware routing table.

The hardware processor 120 executes instructions 136 to receive, from the second network routing device 160, a first BFD response frame that corresponds to the first BFD echo frame. A BFD response frame may be sent for each BFD echo frame that was received by the second network routing device 160. In situations where the second network routing device 160 has routing data for the first network routing device 110 in its hardware routing table, the manner in which the BFD response frames are routed to the network routing device 110 are controlled by the routing data in the hardware routing table. In situations where the second network routing device 160 does not yet have routing data for the first network routing device 110 in its hardware routing table, one or more intermediary devices may use various routing techniques and software to route the BFD response packets to the first network routing device 110.

The hardware processor 120 executes instructions 138 to determine that a response time associated with the BFD response frame does not meet a BFD response time threshold. Each BFD response frame may be associated with a round-trip time (RTT), e.g., the amount of time elapsed between sending a BFD echo frame and receiving the corresponding BFD response frame. In an operational BFD session, the RTT for any given BFD response frame should be within a threshold RTT, except in situations where there is a failure. In some implementations, a BFD response time threshold may be a predetermined response time, e.g., based on an expected RTT for using hardware routing tables and measured in milliseconds. In a situation where the RTT does not meet the BFD response time threshold, it may be inferred that the BFD session between the network routing device 110 and the second network routing device 160 has not yet been established. This situation may occur, for example, during initialization of the BFD session, as the second network routing device 160 may not have its hardware routing table updated with the routing information to send BFD response frames back to the network routing device 110 fast enough to meet the BFD response time threshold.

The hardware processor 120 executes instructions 140 to determine, in response to the determination, that a BFD failure threshold has not been meet. A BFD failure threshold may be, for example, a threshold number of BFD echo frames or a threshold period of time. For example, a BFD failure threshold may be set at 30 seconds from the time the network routing device 110 sends the first BFD echo packets to the second network routing device 160. In this example, as long as BFD response frames with RTTs that don't meet the BFD response time threshold are occurring within the 30 second threshold, the hardware processor 120 may determine that the BFD failure threshold has not been met.

The hardware processor 120 executes instructions 142 to transmit a second BFD echo frame to the second network routing device 160 after the determination that the BFD failure threshold has not been met. In this situation, the network routing device is trying to establish a BFD session again, or measuring response times to determine whether the BFD session has been established, e.g., by sending a second BFD echo frame or second stream of echo frames after the first echo frame(s) failed to meet the BFD response time threshold.

The hardware processor 120 executes instructions 144 to receive, from the second network routing device 160, a second BFD response frame that corresponds to the second BFD echo frame. As noted above, the second BFD response frame may be one frame of a stream of frames, and it may be sent/received in a manner similar to the first BFD response frame(s). In some situations, the second network routing device 160 will update its hardware routing table with routing data for the network routing device 110, e.g., in response to receiving the first BFD echo frame(s). In this situation, the second BFD response frame(s) may reach the network routing device 110 faster than the first BFD response frame(s).

The hardware processor 120 executes instructions 146 to determine whether a second response time associated with the second BFD response frame meets the BFD response time threshold. This may be performed in a manner similar to the manner in which the threshold determination was made for the first BFD response frame. In situations where the RTT for the second BFD response frame meets the BFD response time threshold, this may indicate that a BFD session has been successfully established between the network routing device 110 and the second network routing device 160. In situations where the RTT of the second BFD fame does not meet the BFD response time threshold, echo and response frames may be repeatedly sent/received, and RTTs compared to the BFD response time threshold, until they either meet the threshold—indicating BFD session establishment was successful—or until the BFD failure threshold has been met—indicating that the BFD session establishment failed.

The hardware processor 120 executes instructions 148 to provide, to the requesting device 150, a notification that a BFD session has been established between the network routing device 110 and the second network routing device 160. The notification may be, for example, a frame indicating BFD session establishment success. The instructions 132-148 depicted in the example block diagram 100 depict an example implementation, and different instructions may be executed by the hardware processor 120 in different situations. For example, in situations where BFD session establishment fails, e.g., determined by the network routing device 110 in response to the BFD failure threshold being met, a notification that the BFD session failed to be established may be provided to the requesting device 150. Additional implementations and examples are described with respect to FIGS. 2-4.

Figure 2:
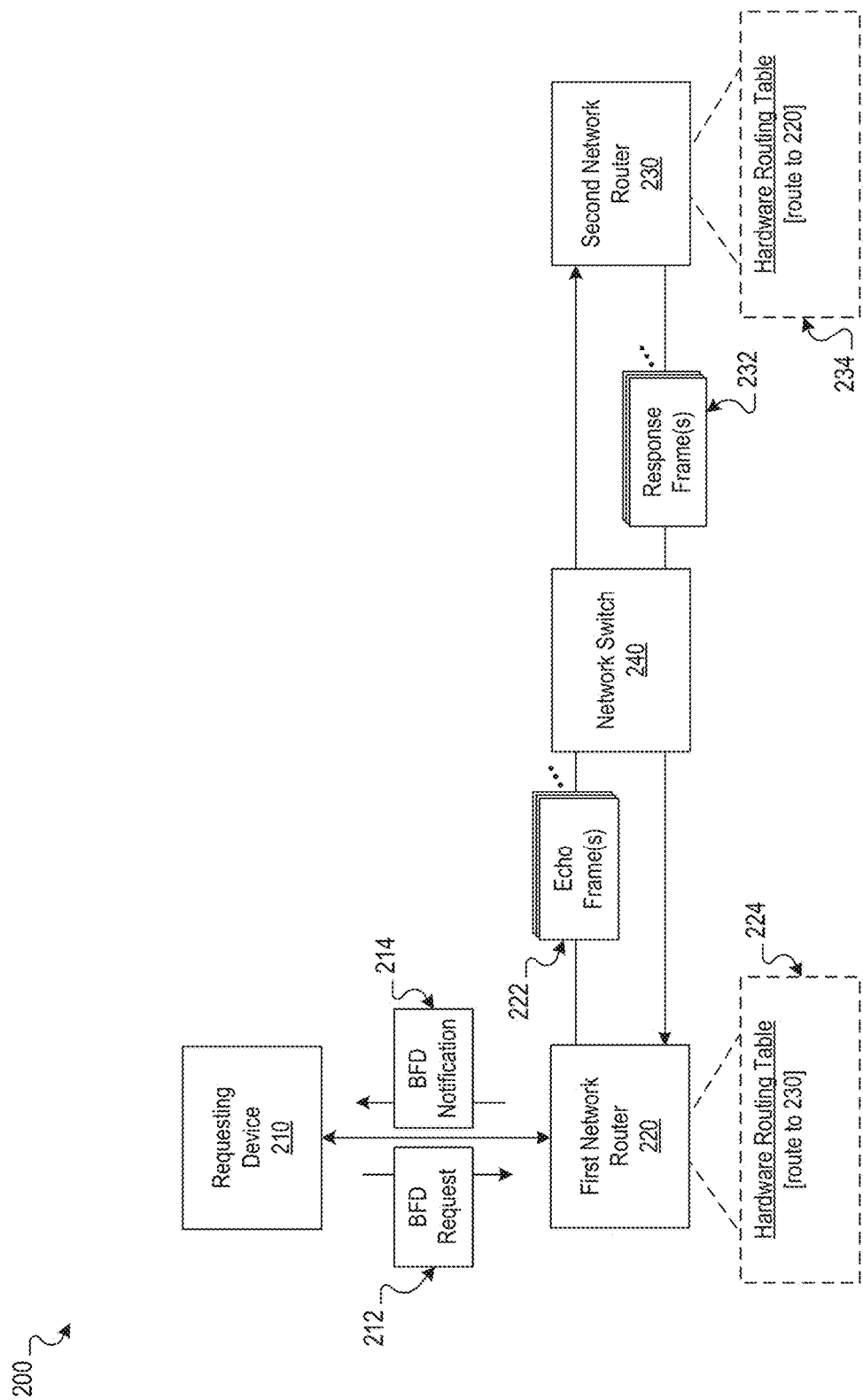
FIG. 2 is an example data flow depicting the establishment of a network fault detection session.

FIG. 2 is an example data flow 200 depicting the establishment of a network fault detection session. The example data flow 200 includes a requesting device 210, a first network router 220, a second network router 230, and a network switch 240. The requesting device 210 may be the same as or similar to the requesting device 150 of FIG. 1, e.g., a computing device or input device. The first network router 220 and second network router 230 may each be the same as or similar to the network routing device 110 and/or second network routing device 160 of FIG. 1. By way of example, the network routers and switch may be SDN elements included in a SDN, and the requesting device 210 may represent an SDN controller.

While the example data flow 200 depicts two routers and one switch, the depicted devices may operate in an environment with or in communication with many other devices. For example, the each network router may be in communication with multiple other network routers, either directly or through one or more network switches or other computing devices connected to the network in which they operate. Many other devices, such as server computers, load balancing devices, network security devices, and client computers, may also be included in the network in which the depicted devices operate, and they may be in direct or indirect communication with the depicted devices. In addition, the functionality of the requesting device 210, while depicted separately from the routers, may be included in the network routers themselves.

During operation, the requesting device 210 sends a BFD request 212 to the first network router 220. Using the SDN example, the requesting device 210 may be an SDN controller, and the BFD request 212 may be instructions from the SDN controller to cause two routers to establish a BFD session to be able to quickly detect a fault in either of the routers. The BFD request may specify the second network router 230 as the router with which the first network router 220 should communicate to establish the BFD session.

The first network router 220, in response to receiving the BFD request, may begin by adding routing data to the second network router 230 to its hardware routing table 224. In some situations, the routing data may be provided by the requesting device 210, previously discovered by the first network router 220, or—in some implementations—discovered and added to the hardware routing table 224 after the echo frames are sent. Routing data added to the hardware routing table 224 may include, for example, an outgoing network interface to use for forwarding frames, a netmask, a metric indicating the cost of using a particular route, and addresses of the second network router 230 and next hop addresses, such as the address of the network switch 240 and any intervening devices.

The first network router 220 sends a stream of echo frames 222 to the second network router 230. In the example data flow, the stream of echo frames 222 are not transmitted directly, but are transmitted through the network switch 240 that connects the two routers. The echo frames 222 may include payload data indicating that they are for establishing BFD session between the first and second router.

The second network router 230 receives the echo frames 222 and responds to them with its own stream of response frames 232. The hardware routing table 234 of the second network router 230 is also updated to include routing data to the first network router 220. However, the first response frames 232 may be sent from the second network router 230 before its hardware routing table 234 is updated. In situations where the first response frames 232 are sent without having routing data to the first network router 220 stored in the hardware routing table 234, the first response frames 232 will likely be subject to a slower routing method, e.g., relying on software of the network switch 240 to determine how to forward the response frames 232 to the first network router 220. In some situations, the second network router 230 may have had the routing data to the first network router 220 in its hardware routing table 234 prior to receiving the echo frames 222. In this situation, the response frames 232 could be sent using the routing data in the hardware routing table 234, in a manner likely to cause the response frames 232 to be forwarded to the first network router 220 relatively quickly.

The first network router 220 receives the response frames 232 and measures the RTT, e.g., the time between when the echo frames 222 were sent and when the corresponding response frames 232 were received. The RTTs associated with the echo/response frames are compared to a response time threshold to determine whether the response times are fast enough to satisfy a predetermined threshold for a BFD session, e.g., a time in milliseconds. In making the threshold comparison, RTTs may be averaged over a certain period of time, or measured and individually compared to the threshold, or sampled, aggregated, etc., in other ways.

In response to the response times meeting the response time threshold, the first network router 220 may determine that the BFD session was successfully established and send a BFD notification 214 to the requesting device 210. The network routers may then continue operations normally, with an active BFD session causing the routers to periodically send echo and response frames to one another in a manner designed to quickly identify any faults.

In response to the response times failing to meet the response time threshold, e.g., the response frames 232 were not receives quickly enough to meet the response time threshold for a successfully established BFD session, the first network router 220 determines whether BFD session establishment failed. This may be determined in a variety of ways. To allow time for the second network router 230 to update its hardware routing table 234, the first network router 220 may not determine a BFD session failed to establish after the first response frames 232 fail to meet a response time threshold. In some implementations, the first network router may use a BFD session failure threshold to determine whether the BFD session was successfully established, or if it failed.

For example, a BFD threshold may be a period of time, such as 30 seconds, from the time the BFD request 212 was sent or from the time the first echo frames 222 were sent. In this example, the first network router 220 would continue to send echo frames 222 as long as it was within the 30 second threshold until either the response times met the response time threshold—indicating successful BFD session establishment—or until the 30 seconds passed, e.g., in a manner designed to allow the second network router 230 up to 30 seconds to update its hardware routing table 234 and provide a faster response to the echo frames 222. As another example, a number of echo frames 222 or number of batches of echo frames 222 sent may be used as a BFD session failure threshold. In this example, the first network router 220 may continue to send echo frames 222 until either the response times meet the response time threshold—indicating successful BFD session establishment—or until a predetermined number of echo frames 222 were sent.

In some implementations, as shown in the example data flow 200, notifications regarding BFD session establishment may be provided after determining whether a BFD session was successfully established. For example, the first network router 220 may provide a BFD notification 214 to the requesting device, and the BFD notification 214 may indicate whether the BFD session was successfully established, or not. As noted above, the data flow 200 is one example implementation of establishing a network fault detection session, and many variations of the process and devices for performing the process may be used. For example, BFD requests and notifications may be included in the operations performed by the first network router, e.g., in situations where network routers are configured to establish BFD sessions on their own, e.g., without external requests or input.

Figure 3:
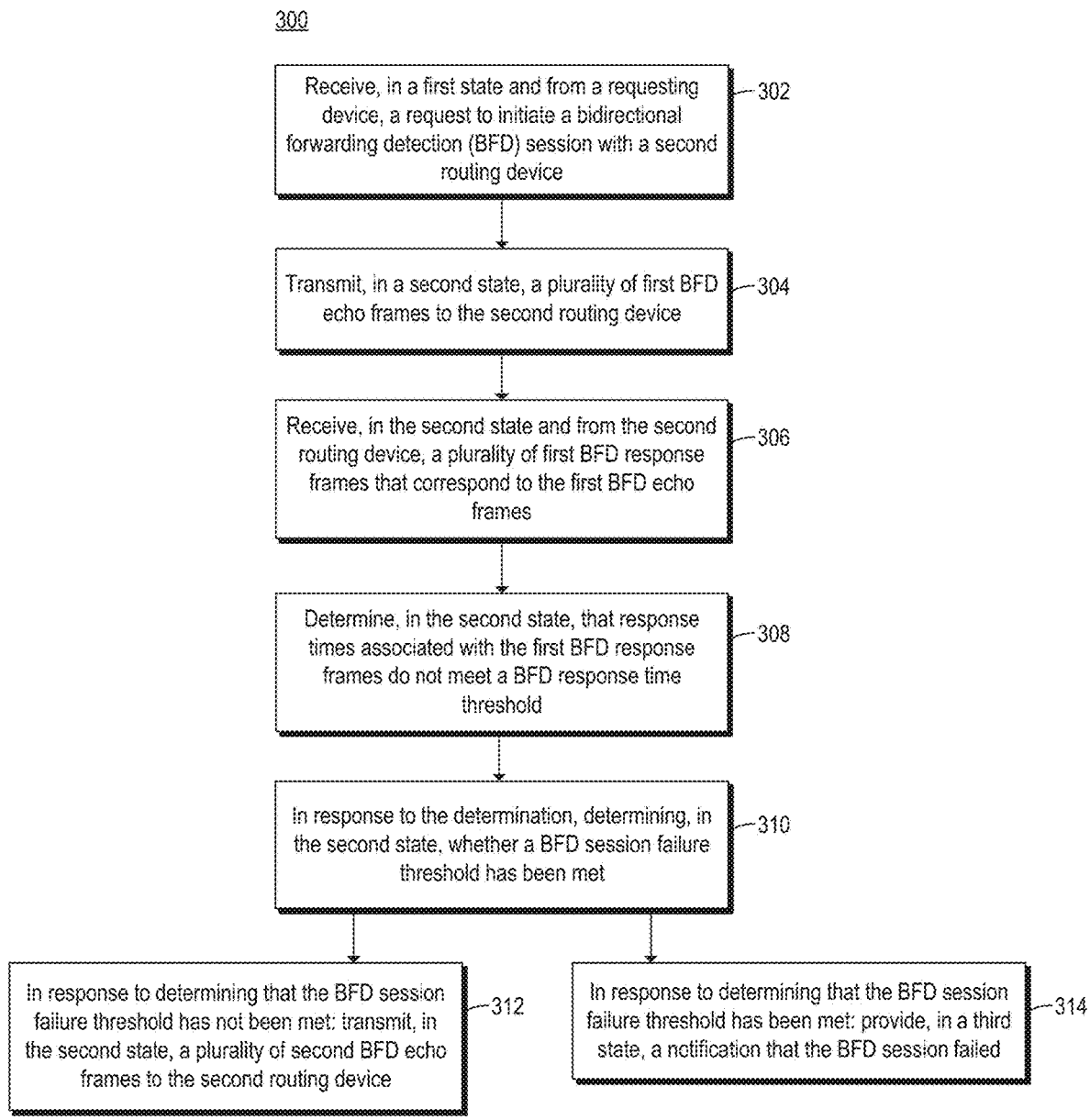
FIG. 3 is a flowchart of an example method for establishing a network fault detection session.

FIG. 3 is a flowchart of an example method 300 for establishing a network fault detection session. The method 300 may be performed by a routing device, such as the routing device described in FIG. 1. Other devices may also be used to execute method 300. Method 300 may be implemented in the form of executable instructions stored on a machine-readable storage medium, such as the storage medium 130, and/or in the form of electronic circuitry, such as an FPGA or ASIC.

A request to initiate a bidirectional forwarding detection (BFD) session with a second routing device is received in a first state and from a requesting devices (302). For example, a network router may operate in a first idle state, where no BFD session is active between the router and a second router. While in this idle state, a request to establish a BFD session with a second router may be received. An idle state may indicate that the router is ready to establish a BFD session.

While in a second state, a plurality of first BFD echo frames are transmitted to the second routing device (304). In some implementations, the receipt of the request to initiate the BFD session may cause the transition from the first state to the second state. The second state may be, for example, an initializing state where a router transmits echo packets and measures response times associated with response packets to determine whether a BFD session is successfully established.

While in the second state, a plurality of first BFD response frames that correspond to the first BFD echo frames are received from the second routing device (306). As noted in the example above, the first BFD response frames may be received while the router is in an initializing state.

While in the second state, it is determined that response times associated with the first BFD response frames do not meet a BFD response time threshold (308). For example, while a router is in the initializing state, it may compare RTTs for BFD echo/response frames to a threshold response time and, in this example implementation, the RTTs fail to meet the BFD response time threshold.

While in the second state, it may be determined whether a BFD session failure threshold has been met (310). For example, given a BFD session failure threshold of 30 seconds from transmission of the first BFD echo frames, a router may determine, while in the initializing state, whether the BFD session had failed to be established. While less than 30 seconds have lapsed, the router may determine that the BFD session failure threshold has not occurred. After 30 seconds pass, the router may determine that the BFD session failure threshold is met. This may cause the transition to a third state, e.g., a failed state indicating that the routing device will no longer retry BFD session establishment.

While in the second state, in response to determining that the BFD session failure threshold has not been met, a plurality of second BFD echo frames may be transmitted to the second routing device (312). For example, while still in the initializing state, a router may retry establishment of the BFD session by resending echo frames and measuring the response times, e.g., in a manner designed to allow the second router time to update its hardware routing table and response within the response time threshold.

While in the second state, in response to determining that response times associated with a set of BFD response frames meets a BFD response time threshold, it may be determined that a BFD session was successfully established. In this situation, a router may transition from the second state to a fourth state, e.g., an active BFD state that indicates a BFD session was successfully established and is active between the router and the second router. In some implementations, a notification may be sent regarding the successful establishment of the BFD session, e.g., to a requesting device.

While in the second state, in response to determining that the BFD failure threshold has been met, it may be determined that BFD session establishment failed, causing transition to a third state. In some implementations, the determination that BFD session establishment failed may also cause a notification to be sent indicating such failure, e.g., to a requesting device. In some implementations, while in the third state, e.g., the failed state, a router may transition back to the first state, e.g., after a period of time, upon request, or in response to another predetermined condition being met.

Figure 4:
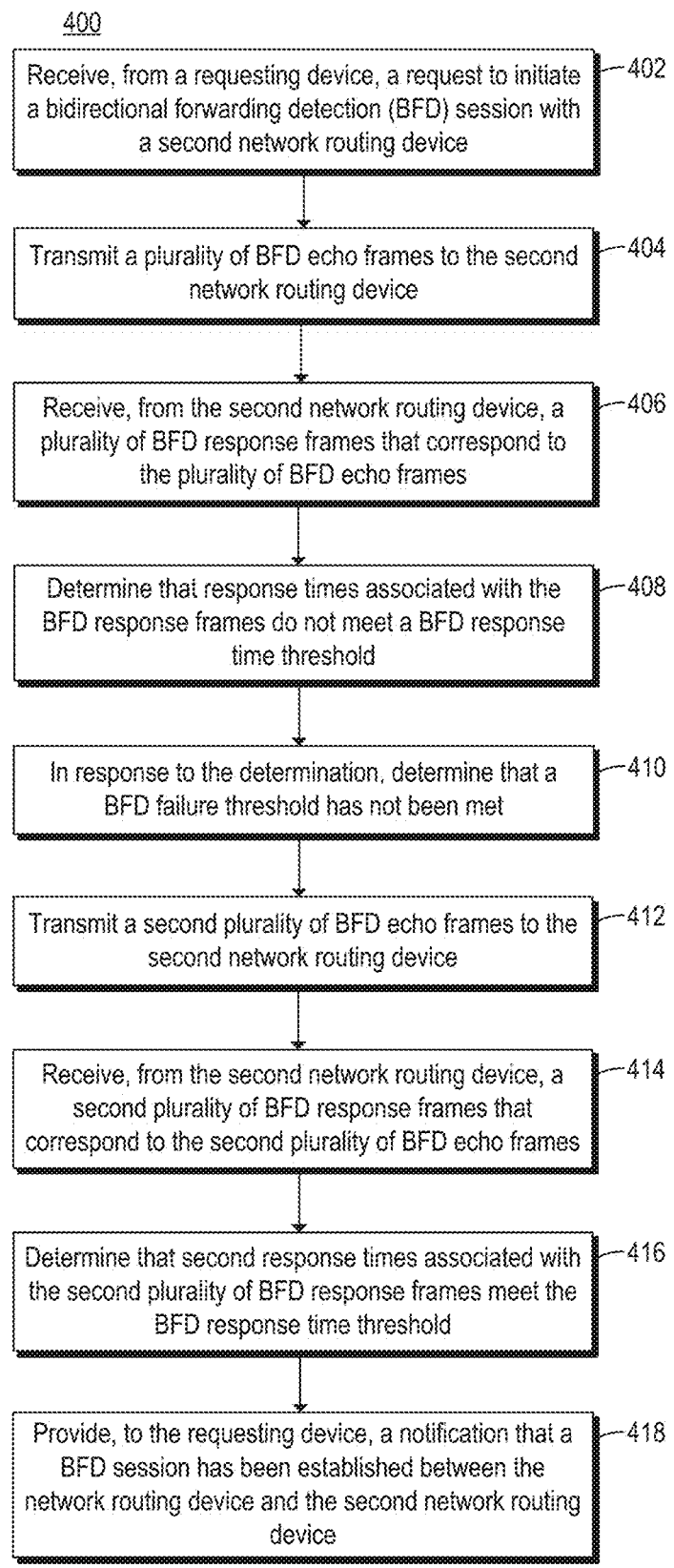
FIG. 4 is a flowchart of an example method for the establishment of a network fault detection session.

FIG. 4 is a flowchart of an example method 400 for the establishment of a network fault detection session. As with method 300, method 400 may be performed by a routing device, such as the routing device described in FIG. 1. Other devices may also be used to execute method 400. Method 400 may be implemented in the form of executable instructions stored on a machine-readable storage medium, such as the storage medium 130, and/or in the form of electronic circuitry, such as an FPGA or ASIC.

A request to initiate a bidirectional forwarding detection (BFD) session with a second network routing device is received from a requesting device (402). E.g., in a manner similar to 302, a network router may receive a request to initiate a BFD session with a second network router.

A plurality of BFD echo frames are transmitted to the second network routing device (404). For example, in a manner similar to 304, a network router may stream echo frames to a second network router.

A plurality of BFD response frames that correspond to the plurality of BFD echo frames are received from the second network routing device (406). For example, in a manner similar to 306, a network router may receive response frames that each correspond to one of the transmitted echo frames.

It is determined that response times associated with the BFD response frames do not meet a BFD response time threshold (408). For example, in a manner similar to 308, a network router may determine that the RTT of the received response frames does not meet a BFD response time threshold.

A determination is made, in response to the determination at 408, that a BFD failure threshold has not been met (410). E.g., the determination regarding the BFD failure threshold is made in response to the determination of failure in 408, because a success in 408 would indicate that the BFD session was successfully established, obviating any need to determine whether the BFD failure threshold was met. The actual determination regarding the BFD failure threshold may be made in a manner similar to 312, e.g., based on total elapsed time since BFD session establishment attempts began, or number of echo frames sent to establish a BFD session.

A second plurality of BFD echo frames are transmitted to the second network routing device after the determination that the BFD failure threshold has not been met (412). For example, in a situation where a router has not successfully established a BFD session, but a BFD failure threshold has not yet been met, additional echo frames may be sent in an attempt to retry BFD session establishment.

A second plurality of BFD response frames that correspond to the second plurality of BFD echo frames are received from the second network routing device (414). For example, these echo frames are received in a manner similar to 406.

It is determined that response times associated with the second plurality of BFD response frames meet the BFD response time threshold (408). For example, in a situation where the second network router initially did not have the first router in its hardware routing table, first BFD response frames may have been delayed, causing RTTs to fail to meet the BFD response time threshold. After adding routing data to the first network router to its hardware routing table, the second network routing device may be able to respond to later BFD echo frames faster, resulting in RTTs associated with later BFD response frames to meet the BFD response time threshold.

A notification is provided to the requesting device, the notification indicating that a BFD session has been established between the network routing device and the second network routing device (418). For example, an application running on a requesting device may be provided with a notification that indicates a BFD session is now active between the first network routing device and the second network routing device.

The foregoing disclosure describes a number of example implementations for establishing a network fault detection session. As detailed above, examples provide a mechanism for using selective thresholds and BFD response times to determine when routing devices indicate BFD session establishment or failure.

We claim:

1. A network routing device for establishing a network fault detection session, the network routing device comprising:
 a hardware processor; and a data storage device storing instructions that, when executed by the hardware processor, cause the hardware processor to:
 receive, from a requesting device, a request to initiate a bidirectional forwarding detection (BFD) session with a second network routing device different from the requesting device;
 transmit a first BFD echo frame to the second network routing device;
 receive, from the second network routing device, a first BFD response frame that corresponds to the first BFD echo frame;
 perform a first determination to determine that a response time associated with the BFD response frame is not less than a BFD response time threshold;
 in response to the first determination, perform a second determination to determine that either a time period since transmission of the first BFD echo frame or a total number of BFD echo frames with a corresponding response time not within the BDF response time threshold, is less than a BFD failure threshold;
 after a result of the second determination is in affirmative, transmit a second BFD echo frame to the second network routing device;
 receive, from the second network routing device, a second BFD response frame that corresponds to the second BFD echo frame;
 determine whether a second response time associated with the second BFD response frame is less than the BFD response time threshold; and
 in response to determining that the second response time is less than the BFD response time threshold, provide, to the requesting device, a notification that a BFD session has been established between the network routing device and the second network routing device.

2. The network routing device of claim 1, wherein the BFD response time threshold is based on an expected hardware routing table response time for the second network routing device.

3. The network routing device of claim 1, wherein the first BFD response frame was sent by the second network routing device prior to an address of the network routing device being included in a hardware routing table of the second network routing device.

4. The network routing device of claim 1, wherein the second BFD response frame was sent by the second network routing device after an address of the network routing device was added to a hardware routing table of the second network routing device.

5. The network routing device of claim 1, wherein the first BFD echo frame causes the second network routing device to add an address of the network routing device to a hardware routing table of the second network routing device.

6. A network routing device for establishing a network fault detection session, the network routing device including a programmable hardware processor to:
 receive, from a requesting device, a request to initiate a bidirectional forwarding detection (BFD) session with a second network routing device different from the requesting device;
 transmit a first plurality of BFD echo frames to the second network routing device;
 receive, from the second network routing device, a first plurality of BFD response frames that correspond to the first plurality of BFD echo frames;
 perform a first determination to determine that response times associated with the first plurality of BFD response frames are not less than a BFD response time threshold;
 in response to the first determination, perform a second determination to determine that either a time period since transmission of the first plurality of BFD echo frames or a total number of BFD echo frames with a corresponding response time not within the BDF response time threshold, is less than a BFD failure threshold;
 after a result of the second determination is in affirmative, transmit a second plurality of BFD echo frames to the second network routing device;
 receive, from the second network routing device, a second plurality of BFD response frames that correspond to the second plurality of BFD echo frames;
 determine that second response times associated with the second plurality of BFD response frames is less than the BFD response time threshold; and
 provide, to the requesting device, a notification that a BFD session has been established between the network routing device and the second network routing device.

7. The network routing device of claim 6, wherein the BFD response time threshold is based on an expected hardware routing table response time for the second routing device.

8. The network routing device of claim 6, wherein the programmable hardware processor: transitions from a first state to a second state in response to receiving the request; and transitions from the second state to a fourth state in response to the second determination not being affirmative.

* * * * *